(12) United States Patent
Hosokawa et al.

(10) Patent No.: US 6,908,671 B2
(45) Date of Patent: Jun. 21, 2005

(54) TRANSPARENT PRESSURE-SENSITIVE ADHESIVE COMPOSITION AND PRESSURE-SENSITIVE ADHESIVE SHEET THEREOF

(75) Inventors: Toshitsugu Hosokawa, Ibaraki (JP); Yoshihiro Hieda, Ibaraki (JP); Kazuhiko Miyauchi, Ibaraki (JP); Yuuichi Morimoto, Ibaraki (JP); Yukiko Azumi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 89 days.

(21) Appl. No.: 10/274,986

(22) Filed: Oct. 22, 2002

(65) Prior Publication Data

US 2003/0102081 A1 Jun. 5, 2003

(30) Foreign Application Priority Data

Oct. 26, 2001 (JP) ..................................... P. 2001-330037

(51) Int. Cl.$^7$ ........................... C09J 133/08; C09J 7/02; C08K 3/34
(52) U.S. Cl. ................ 428/355 AC; 428/343; 156/331.8; 156/289
(58) Field of Search .................. 428/355 AC, 343; 156/331.8, 289

(56) References Cited

U.S. PATENT DOCUMENTS

2003/0102081 A1 * 6/2003 Hosokawa et al. ...... 156/331.8

OTHER PUBLICATIONS

Pat Abstract of Jap Pub. No 07–090229 Sekisui Chem Co. Ltd, Machine Translation, Apr. 4, 1995.*
Pat. Abstract of Jap. Pub No 08–245927 Sony Chem Corp, Machine Translation, Sep. 24, 1996.*
XP–002253917—Abstract ((1995).
European Search Report dated Sep. 26, 2003.

* cited by examiner

*Primary Examiner*—Daniel Zirker
(74) *Attorney, Agent, or Firm*—Sughrue Mion, PLLC

(57) ABSTRACT

A transparent acrylic pressure-sensitive adhesive composition which combines transparency and high-temperature adhesive properties. The transparent pressure-sensitive adhesive composition contains a polymer of one or more acrylic-based monomers and an organophilic layered clay mineral dispersed therein, wherein part of the polymer has been intercalated between layers of the clay mineral to cause interlayer separation and the clay mineral has a layer-to-layer distance of 100 Å or longer. It is produced by a process which includes: mixing 100 parts by weight of the monomers with 10 to 150 parts by weight of an organophilic layered clay mineral and 0.005 to 5 parts by weight of a polymerization initiator together with an organic solvent; exerting an external action on this mixture to thereby intercalate part of the monomers, polymerization initiator, and organic solvent into interstices of the organophilic layered clay mineral; subsequently removing the solvent; and then polymerizing the monomers.

11 Claims, No Drawings

TRANSPARENT PRESSURE-SENSITIVE ADHESIVE COMPOSITION AND PRESSURE-SENSITIVE ADHESIVE SHEET THEREOF

FIELD OF THE INVENTION

The present invention relates to a transparent pressure-sensitive adhesive composition comprising an acrylic polymer and an organophilic layered clay mineral dispersed therein and to a pressure-sensitive adhesive sheet of the composition.

DESCRIPTION OF THE RELATED ART

Recently, pressure-sensitive adhesives have come to be used in a wider range of applications and the properties required of the adhesives tend to become higher accordingly. In particular, the upper limit of temperatures at which pressure-sensitive adhesives are used has become higher and high-temperature adhesive properties have become more important than before. This desire for high-temperature adhesive properties is growing also in the field of transparent pressure-sensitive adhesive sheets for use in laminating a plastic protective plate or glass plate in display production or in laminating a polarizing film in producing polarizing displays.

Pressure-sensitive adhesives are roughly divided into the rubber-based type and the acrylic type. Of these, the rubber-based pressure-sensitive adhesives have excellent adhesive properties at around ordinary temperature but are inferior in weatherability and transparency. Because of this, the acrylic pressure-sensitive adhesives are mainly used as the pressure-sensitive adhesives for optical use.

It has been attempted to add various fillers including silica to an acrylic pressure-sensitive adhesive in order to improve high-temperature adhesive properties. However, the addition of a filler impairs the surface smoothness of adhesive layers and this tends to result in a decrease in adhesive force and a decrease in transparency. In Japanese Patent Laid-Open Nos. 7-90229 and 8-245927, an attempt has been made to add an organophilic layered clay mineral for the purpose of viscosity regulation in the ultraviolet polymerization method. Although clay minerals, which constitute a group of inorganic layered substances, are known as relatively inexpensive fillers, it is difficult even with the organophilic layered clay mineral to reconcile high-temperature adhesive properties and a high-level of transparency.

SUMMARY OF THE INVENTION

Although acrylic pressure-sensitive adhesives are excellent in transparency and other properties and suitable for use as pressure-sensitive adhesives for optical applications, the related-art techniques for improving the high-temperature adhesive properties thereof by, e.g., addition of a filler, have resulted in an insufficient effect or a decrease in transparency, as described above. Namely, it has been difficult to reconcile transparency and high-temperature adhesive properties.

An object of the invention is to provide, under these circumstances, an acrylic pressure-sensitive adhesive or a pressure-sensitive adhesive sheet thereof which each can attain both transparency and high-temperature adhesive properties.

As a result of intensive investigations to accomplish the object, it has been found that when an acrylic pressure-sensitive adhesive comprising an acrylic polymer and an organophilic layered clay mineral is to be produced from a mixture of an acrylic monomer and the clay mineral through a polymerization reaction such as photopolymerization, the adhesive can be obtained in a highly useful form by conducting the process in the following manner. The monomer is mixed with the organophilic layered clay mineral, a polymerization initiator, and an organic solvent, and an appropriate external action is exerted on this mixture to thereby intercalate part of the monomer, polymerization initiator, and organic solvent into interstices of the organophilic layered clay mineral. This mixture is subsequently subjected to solvent removal and polymerization. As a result, the clay mineral undergoes interlayer separation due to the polymer formed in the interstices of the clay mineral and hence comes to have a layer-to-layer distance of 100 Å or longer, whereby a composite comprising the polymer yielded and the clay mineral finely and completely dispersed therein is obtained. This composite can retain excellent high-temperature adhesive properties attributable to the clay mineral and an exceedingly high level of transparency. Namely, it has been found that a transparent pressure-sensitive adhesive composition which combines transparency and high-temperature adhesive properties can be obtained by the process described above. The invention has been completed based on this finding.

The invention provides a transparent pressure-sensitive adhesive composition which comprises a polymer of one or more monomers (i.e., acrylic-based monomers) comprising from 70 to 100% by weight at least one alkyl (meth)acrylate in which the alkyl group has 2 to 14 carbon atoms and from 30 to 0% by weight at least one monoethylenically unsaturated monomer copolymerizable therewith and an organophilic layered clay mineral dispersed in the polymer in an amount of from 10 to 150 parts by weight per 100 parts by weight of the polymer, wherein part of the polymer has been intercalated between layers of the clay mineral to cause interlayer separation and the clay mineral has a layer-to-layer distance of 100 Å or longer.

Preferred embodiments of the transparent pressure-sensitive adhesive composition of the invention, which has the constitution described above, include: the transparent pressure-sensitive adhesive composition wherein the organophilic layered clay mineral is one formed by ion exchange between exchangeable inorganic ions of a layered clay mineral and organic onium ions; the transparent pressure-sensitive adhesive composition wherein the organic onium ions are organic ammonium ions; the transparent pressure-sensitive adhesive composition wherein the content of inorganic ingredients is from 3 to 25% by weight; and the transparent pressure-sensitive adhesive composition which when examined in the form of a film, has a haze of 5% or lower and a total light transmittance of 85% or higher.

The invention further provides a pressure-sensitive adhesive sheet which comprises a releasable substrate or non-releasable substrate and, disposed thereon, a pressure-sensitive adhesive layer constituted of a transparent pressure-sensitive adhesive composition having the constitution described above. In this specification, the term "pressure-sensitive adhesive sheet" implies not only pressure-sensitive adhesive sheets, which are usually wide, and pressure-sensitive adhesive tapes, which are usually narrow, but also various pressure-sensitive adhesive products including pressure-sensitive adhesive labels.

The invention furthermore provides a process for producing a transparent pressure-sensitive adhesive composition having the constitution described above which comprises: mixing 100 parts by weight of one or more monomers comprising from 70 to 100% by weight of at least one alkyl (meth)acrylate having 2 to 14 carbon atoms in the alkyl moiety and from 30 to 0% by weight at least one monoethylenically unsaturated monomer copolymerizable therewith with from 10 to 150 parts by weight of an organophilic layered clay mineral and from 0.005 to 5 parts by weight of a polymerization initiator together with an organic solvent; exerting an external action on this mixture to thereby intercalate part of the monomers, polymerization initiator, and organic solvent into interstices of the organophilic layered clay mineral; subsequently removing the solvent; and then polymerizing the monomers. In a preferred embodiment of this process for producing a transparent pressure-sensitive adhesive composition having the constitution described above, the external action is a shearing external action or a vibrating external action.

The invention still further provides a process for producing a pressure-sensitive adhesive sheet having the constitution described above which comprises conducting the steps of solvent removal and polymerization in the process described above on a releasable substrate or a non-releasable substrate.

DETAILED DESCRIPTION OF THE INVENTION

The alkyl (meth)acrylate used in the invention is the main component of the acrylic-based monomers, and is preferably the monofunctional unsaturated (meth)acrylate of a nontertiary alkyl alcohol. It is selected from alkyl (meth)acrylates having 2 to 14 carbon atoms in the alkyl moiety. Examples of such alkyl (meth)acrylates include ethyl (meth)acrylate, butyl (meth)acrylate, isoamyl (meth)acrylate, n-hexyl (meth)acrylate, 2-ethylhexyl (meth)acrylate, isooctyl (meth) acrylate, isononyl (meth)acrylate, decyl (meth)acrylate, and dodecyl (meth)acrylate. Those can be used alone or as mixtures of two or more thereof.

The monoethylenically unsaturated monomer copolymerizable with the alkyl (meth)acrylate is used to improve or modify heat resistance and adhesive properties through the incorporation of functional groups or polar groups by copolymerization with the alkyl (meth)acrylate. Examples of this unsaturated monomer include acrylic acid, itaconic acid, sulfopropyl acrylate, hydroxyalkyl acrylates, cyanoalkyl acrylates, acrylamide, substituted acrylamides, N-vinylcaprolactam, acrylonitrile, 2-methoxyethyl acrylate, glycidyl acrylate, vinyl acetate, N,N-dimethylaminoethyl acrylate, acryloylmorpholine, and N-vinylpyrrolidone. One or more of those can be used according to purposes.

The alkyl (meth)acrylate and the monoethylenically unsaturated monomer copolymerizable therewith are used in such a ratio that the proportion of the alkyl (meth)acrylate, serving as the main component, is from 70 to 100% by weight, preferably from 85 to 100% by weight, and that of the monoethylenically unsaturated monomer copolymerizable therewith is from 30 to 0% by weight, preferably from 15 to 0% by weight. By using the monomers in such proportions, adhesive properties can be well balanced with creep characteristics (cohesive force) or the like.

The organophilic layered clay mineral used in the invention is obtained by subjecting a layered clay mineral to an organization treatment to thereby impart a satisfactory affinity for the acrylic-based monomers and for the polymer thereof. Usually, an organophilic layered clay mineral formed by ion exchange between exchangeable inorganic ions of a layered clay mineral and organic onium ions is used. Examples of the layered clay mineral include smectite clay minerals such as montmorillonite, saponite, and hectorite, vermiculite, halloysite, and swelling mica. The cation-exchange capacity of the layered clay mineral is desirably regulated to a value in the range of from 50 to 200 meq/100 g from the standpoint of affinity for the monomers, organic solvent, and other ingredients to be intercalated between layers.

Examples of the organic onium ions used for the ion exchange include ammonium ions, pyridinium ions, sulfonium ions, and phosphonium ions. Organic ammonium ions are especially preferred. Examples of the organic ammonium ions include quaternary ammonium salts such as alkylamine hydrochlorides formed by making organic amines, such as dodecylamine, tetradecylamine, hexadecylamine, and octadecylamine, cationic with hydrochloric acid or the like, and further include tetraalkylammonium salts.

Of those, preferable organic ammonium ions are quaternary ammonium salts having a polyoxypropylene group in the molecule, represented by the following formula (1):

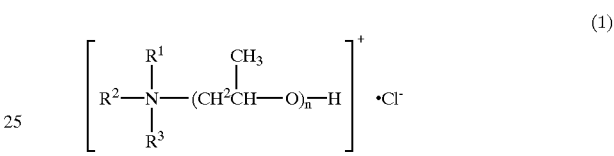

wherein $R^1$ to $R^3$ each are methyl or ethyl,
from the standpoint that such ammonium salts are apt to cause the monomers, organic solvent, and other ingredients to be intercalated between layers and thereby enable the clay mineral to be satisfactorily dispersed in the acrylic pressure-sensitive adhesive to be obtained through polymerization. Quaternary ammonium salts having a long-chain alkyl group in the molecule are also preferably used.

The formation of an organophilic layered clay mineral is accomplished by ion exchange between exchangeable inorganic ions, e.g., sodium or magnesium ions, of a layered clay mineral and organic onium ions. In this operation, it is desirable that the organic onium ions be used in an amount equivalent to the cation-exchange capacity of the layered clay mineral. From the standpoint of dispersibility of the layered clay mineral, a protonic solvent such as water, or an alcohol is preferably used as the solvent for this ion exchange.

The organophilic layered clay mineral thus obtained has the so-called intercalation structure, which comprises silicate layers as the main component of the layered clay mineral and organic onium ions intercalated between the layers and adsorbed onto the silicate surface based on ionic interaction. Due to this structure, ingredients including the monomers and the organic solvent are apt to come into interstices of the clay mineral. This intercalation structure can be followed by determining the elongation of the layer-to-layer distance by large angle or small angle X-ray scattering analysis or by determining the content of organic ingredients by thermogravimetric analysis.

In the organophilic layered clay mineral having such an intercalation structure, the content of organic onium ions is generally preferably from 20 to 70% by weight. In case where the content of organic onium ions is lower than 20% by weight, the interstices have so high polarity that ingredients including the monomers and organic solvent are less apt to come thereinto. In case where the content thereof exceeds 70% by weight, the pressure-sensitive adhesive composition contains a large amount of organic onium ions and hence has reduced heat resistance.

In the invention, 100 parts by weight of one or more monomers comprising at least one of the alkyl (meth) acrylates and optionally containing at least one monoethylenically-unsaturated monomer copolymerizable therewith are mixed with from 10 to 150 parts by weight, preferably from 20 to 100 parts by weight, of the organophilic layered clay mineral. In case where the amount of the organophilic layered clay mineral is smaller than 10 parts by weight, the effect of improving high-temperature adhesive properties is insufficient. In case where the amount thereof exceeds 150 parts by weight, transparency decreases.

Examples of the polymerization initiator used in the invention include photopolymerization initiators and heat polymerization initiators.

A photopolymerization initiator is an initiator which generates a free radical by the action of light. Examples thereof include benzoin ethers such as benzoin methyl ether and benzoin propyl ether; substituted benzoin ethers such as anisoin methyl ether; substituted acetophenones such as 2,2-diethoxyacetophenone and 2,2-dimethoxy-2-phenylacetophenone; substituted α-ketols such as 2-methyl-2-hydroxypropiophenone; aromatic sulfonyl chlorides such as 2-naphthalenesulfonyl chloride; and photosensitive oximes such as 1-phenyl-1,1-propanedione-2-O-ethoxycarbonyl oxime.

A heat polymerization initiator is an initiator which generates a free radical by the action of heat. Examples thereof include azo compounds such as azobisisobutyronitrile and organic peroxides. Use of organic peroxides, in particular, brings about satisfactory results in improving adhesive force and cohesive force. Examples of such organic peroxides include benzoyl peroxide, cumene hydroperoxide, and lauroyl peroxide.

Those polymerization initiators are used in an amount suitably selected in the range of from 0.005 to 5 parts by weight per 100 parts by weight of the monomers according to the kind thereof. The amount of the photopolymerization initiator to be used is generally from 0.005 to 1 part by weight, preferably from 0.05 to 0.5 parts by weight. In case where the amount of the photopolymerization initiator is too small, a large amount of monomers remain unreacted after the photopolymerization and this is apt to result in bubble formation at an adhesion interface. In case where the amount thereof is too large, this photopolymerization initiator partly remains in the photopolymerization product and is apt to cause yellowing, etc. For the same reasons, the amount of the heat polymerization initiator to be used is usually from 0.01 to 5 parts by weight, preferably from 0.05 to 3 parts by weight.

The organic solvent in the invention serves to dissolve the monomers and polymerization initiator therein and thereby facilitate intercalation of these ingredients into interstices of the organophilic layered clay mineral. After the intercalation, the organic solvent is removed under vacuum, with heating, or by another technique before the reaction mixture is subjected to a polymerization reaction. Due to the intercalation-facilitating effect, the clay mineral satisfactorily disperses in the acrylic polymer to be yielded by the polymerization reaction, even when the clay mineral is used in a considerably large amount. As a result, a pressure-sensitive adhesive composition which combines high transparency and high high-temperature adhesive properties can be produced.

The organic solvent, which performs such functions, is not particularly limited in kind, as long as it has the ability to wet and swell the organophilic layered clay mineral and the ability to dissolve the monomers therein and can be easily removed under vacuum, with heating, or by another technique. Typical examples thereof include toluene, xylene, acetone, methyl ethyl ketone, ethyl acetate, methanol, and ethanol. Of those, toluene and ethyl acetate are preferable. The amount of the organic solvent used may be suitably determined according to the amount of the organophilic layered clay mineral used, etc. However, the organic solvent is used in an amount of generally from 50 to 1,000 parts by weight, preferably from 50 to 800 parts by weight, per 100 parts by weight of the organophilic layered clay mineral.

In the invention, one or more acrylic-based monomers comprising at least one of the alkyl (meth)acrylates and optionally containing at least one monoethylenically unsaturated monomer copolymerizable therewith are mixed with an organophilic layered clay mineral and a polymerization initiator in a proportion within the range shown above, together with a given amount of an organic solvent. An external action is exerted on this mixture to thereby intercalate part of the monomers, polymerization initiator, and organic solvent into interstices of the organophilic layered clay mineral. The external action is preferably a shearing external action or a vibrating external action. Methods for exerting a shearing external action include techniques in which a high shearing force is exerted to the dispersion obtained by mixing the monomers with an organophilic layered clay mineral and other ingredients. For example, use is made of a method in which the dispersion is treated with a dispersing machine such as a colloid mill, homogenizer, or Disper. Methods for exerting a vibrating external action include a technique in which the dispersion is vibrated with an ultrahigh-power ultrasonic homogenizer.

Besides those external actions, a thermal external action or external pressure action may be additionally exerted. For exerting a thermal external action, use may be made of a method in which the dispersion is treated by heating it to a temperature not higher than the boiling point of the monomers or organic solvent. For exerting an external pressure action, there may be used, for example, a method in which the dispersion is placed in an autoclave and a pressure of about from 1 to 5 $kg/cm^2$ is applied thereto and a method in which the dispersion is treated by applying a high pressure thereto using supercritical carbon dioxide as a medium.

As a result of the intercalation of part of the monomers, polymerization initiator, and organic solvent into interstices of the organophilic layered clay mineral, the layer-to-layer distance in the organophilic layered clay mineral increases generally to 100 Å or longer. This elongation of the layer-to-layer distance can be quantitatively determined by large angle or small angle X-ray scattering analysis.

It is also possible to indirectly or qualitatively ascertain the elongation based on an improvement of the transparency of the dispersion (i.e., a change from the milk-white state before intercalation to a transparent state) or based on a viscosity increase or another change of the dispersion.

In the invention, after part of the monomers, polymerization initiator, and organic solvent have been intercalated between layers of the organophilic layered clay mineral, the solvent is removed and the residual reaction mixture is subjected to a polymerization reaction. The solvent removal may be accomplished with a technique such as drying with heating, drying under vacuum, or spray drying. By such a technique, the organic solvent present in the mixture can be almost completely removed. When the pressure-sensitive adhesive composition to be obtained through polymerization contains an organic solvent remaining therein, there are cases where use of this adhesive composition in laminating constituent members for producing displays or the like may pose problems such as operation errors of apparatus and reduced transparency which are attributable to the corrosion or fouling caused by solvent volatilization. It is hence desirable to remove the organic solvent as completely as possible.

A crosslinking agent for enhancing the cohesive force and other properties of the pressure-sensitive adhesive produced and thereby increasing the shearing strength thereof may be added according to need to the mixture prior to the solvent removal. A polyfunctional (meth)acrylate having two or more (meth)acryloyl groups in the molecule may be used as this crosslinking agent. Examples of this polyfunctional (meth)acrylate include trimethylolpropane tri(meth)acrylate, pentaerythritol tetra(meth)acrylate, 1,2-ethylene glycol di(meth)acrylate, and 1,6-hexanediol di(meth)acrylate.

The amount of such a polyfunctional (meth)acrylate used is generally from 0.02 to 5 parts by weight, preferably from 0.1 to 3 parts by weight, per 100 parts by weight of the monomers. Bifunctional (meth)acrylates are desirably used in relatively large amounts, while (meth)acrylates having a functionality of 3 or higher are desirably used in relatively small amounts. In case where the amount thereof is too small, photopolymerization results in too low a degree of crosslinking and this tends to result in bubble formation at an adhesion interface. In case where the amount thereof is too large, the resultant pressure-sensitive adhesive composition has reduced adhesive force and is apt to cause blistering or the like.

The polymerization reaction is conducted by the photopolymerization method using, e.g., ultraviolet or by the thermal polymerization method according to the kind of the polymerization initiator. From the standpoints of processability into a pressure-sensitive adhesive sheet and adhesive properties, it is especially preferred to employ the photopolymerization method. This photopolymerization is desirably carried out in an oxygen-free atmosphere prepared by replacement with an inert gas, e.g., nitrogen gas, or while keeping the reaction mixture covered with an ultraviolet-transmitting film so as to exclude air therefrom.

In the photopolymerization method, ultraviolet is generally used, which is an electromagnetic radiation having a wavelength range of from about 180 to 460 nm (nanometers). However, an electromagnetic radiation having a wavelength longer or shorter than ultraviolet may also be used. An ultraviolet source used may be an irradiator such as a mercury arc, carbon arc, low-pressure mercury lamp, medium/high-pressure mercury lamp, or metal halide lamp. The intensity of ultraviolet can be suitably set by regulating the distance to the reaction mixture to be irradiated or by regulating the voltage. In view of the irradiation period (productivity), it is usually desirable to use weak light having an intensity of from 0.1 to 7 mW (millwatts)/cm$^2$.

When the polymerization reaction is conducted in the manner described above, the acrylic-based monomers polymerize and, simultaneously with this polymerization, the monomers which have been intercalated between layers of the organophilic layered clay mineral also polymerize. This intersticial polymerization is accompanied by further enlargement of the interstices of the layered clay mineral and by acceleration of interlayer separation. As a result, a pressure-sensitive adhesive composition is obtained which comprises a polymer of the acrylic-based monomers and the organophilic layered clay mineral dispersed therein in an amount of from 10 to 150 parts by weight per 100 parts by weight of the polymer and in which part of the polymer has been intercalated between layers of the clay mineral to cause interlayer separation and the clay mineral has a layer-to-layer distance of 100 Å or longer.

As described above, the pressure-sensitive adhesive composition of the invention comprises a polymer of acrylic-based monomers as the main component and an organophilic layered clay mineral satisfactorily dispersed therein in the form of fine layer of nanometer size. Because of this constitution, the adhesive composition has excellent high-temperature adhesive properties due to the reinforcing effect of the clay mineral and further retains a high level of transparency. Especially when the clay mineral is one originally having a small size, such as, e.g., montmorillonite, saponite, or hectorite, the composition functions as a transparent pressure-sensitive adhesive composition retaining exceedingly high transparency.

Various known additives such as, e.g., a tackifier, antioxidant, and colorant can be incorporated according to need into the transparent pressure-sensitive adhesive composition, which comprises the polymer and the organophilic layered clay mineral, as long as the properties described above are not impaired by the addition of such additives.

In this transparent pressure-sensitive adhesive composition, the content of inorganic ingredients is preferably from 3 to 25% by weight, more preferably from 4 to 20% by weight. The term "inorganic ingredients" as used herein generally means the inorganic components of the organophilic layered clay mineral (which usually account for from 80 to 30% by weight of the layered clay mineral). However, in the case where an inorganic ingredient other than layered clay minerals is added, this inorganic ingredient also is included in the inorganic ingredients. In case where the content of such inorganic ingredients is lower than 3% by weight, the effect of improving high-temperature adhesive properties becomes poor. In case where the content thereof exceeds 25% by weight, transparency decreases. The content of inorganic ingredients can be determined by thermogravimetric analysis.

As described hereinabove, the transparent pressure-sensitive adhesive composition of the invention can combine transparency and high-temperature adhesive properties. The transparency of the composition is as follows. When films of the composition are analyzed by the method in accordance with JIS-K6714, the haze thereof is 5% or lower, preferably 2% or lower, and the total light transmittance thereof is 85% or higher, preferably 90% or higher. Because of such properties, the transparent pressure-sensitive adhesive composition of the invention can be advantageously used in various applications in which those performances are required, such as the laminating of plastic protective plates or glass plates in display production.

For use in such applications, the transparent pressure-sensitive adhesive composition can be provided as a pressure-sensitive adhesive sheet in a sheet or tape form by forming a pressure-sensitive adhesive layer constituted of the adhesive composition on a releasable substrate or non-releasable substrate. This releasable substrate is not particularly required to be transparent because it is finally peeled off when the pressure-sensitive adhesive sheet is used. However, the non-releasable substrate is required to be transparent because this substrate is not peeled off when the pressure-sensitive adhesive sheet is used, i.e., the pressure-sensitive adhesive sheet bearing this substrate is used as it is.

The releasable substrate to be used is, for example, a film of a plastic, e.g., a polyester, having a thickness of usually from 25 to 125 $\mu$m which has been surface-treated with a release agent such as a silicone. The non-releasable substrate to be used is, for example, a transparent plastic film having a thickness of usually from 25 to 125 $\mu$m, such as a polyimide film, polyester film, polytetrafluoroethylene film, polyetheretherketone film, or poly(ether sulfone) film.

These releasable substrates or non-releasable substrates are desired to have satisfactory surface smoothness. This is because when a substrate having poor surface smoothness is used to form thereon a pressure-sensitive adhesive layer constituted of the transparent pressure-sensitive adhesive composition, this adhesive layer has a poor surface state and hence an increased haze. Namely, this adhesive layer has reduced transparency due to light scattering. The surface smoothness of the substrates is preferably such that the center line average surface roughness $R_a$ is 0.2 μm or lower, preferably 0.1 μm or lower, and the maximum height $R_{max}$ is 0.6 μm or lower, preferably 0.4 μm or lower.

This pressure-sensitive adhesive sheet can be easily produced by conducting the solvent removal and polymerization in the process described above on a releasable substrate or non-releasable substrate. Specifically, this procedure comprises: mixing the monomers with an organophilic layered clay mineral and a polymerization initiator together with an organic solvent; exerting an external action to the resultant mixture to thereby intercalate part of the monomers, polymerization initiator, and organic solvent into interstices of the organophilic layered clay mineral; applying this mixture to one or each side of a releasable substrate or non-releasable substrate; subsequently removing the solvent; and then polymerizing the monomers to thereby produce a pressure-sensitive adhesive sheet. It is also possible to use a method in which the solvent removal and polymerization are conducted on a releasable substrate to form a pressure-sensitive adhesive layer constituted of a transparent pressure-sensitive adhesive composition and this pressure-sensitive adhesive layer is applied to one or each side of a non-releasable substrate to produce a pressure-sensitive adhesive sheet.

The invention will be explained below in more detail by reference to Examples thereof. Hereinafter, all "parts" are by weight.

EXAMPLE 1

Preparation of Organophilic Layered Clay Mineral

Twenty grams of a layered saponite clay mineral (cation-exchange capacity, 90 meq/100 g) was dispersed in 400 g of distilled water with stirring. On the other hand, 47.3 g of the quaternary ammonium salt having a polyoxypropylene group and represented by formula (1) (wherein $R^1$ to $R^3$ each are methyl and n is 25) was uniformly mixed with 100 g of water and 100 g of ethanol. This mixture was added to the dispersion of the layered clay mineral, and the resulting dispersion was stirred at 30° C. for 1 hour. Thereafter, the temperature of the dispersion was elevated to 80° C., and the solid precipitated was taken out by filtration. This solid was freeze-dried to remove water therefrom to obtain an organophilic layered clay mineral having a waxy consistency.

X-ray scattering analysis revealed that the layer-to-layer distance in the organophilic layered clay mineral thus obtained was 42 Å. Furthermore, as a result of thermogravimetric analysis, the content of organic ammonium ions in this organophilic layered clay mineral was found to be 60% by weight.

Production of Pressure-Sensitive Adhesive Sheet

A mixture of 20 g of the organophilic layered clay mineral, 80 g of 2-ethylhexyl acrylate, 0.2 g of 1-hydroxycyclohexyl phenyl ketone ("Irgacure 184" manufactured by Ciba-Geigy Corporation) as a photopolymerization initiator, and 150 g of toluene as an organic solvent was stirred with a Three-One Motor for 2 hours to obtain a dispersion. This dispersion was treated with an ultrasonic disperser (manufactured by Nippon Seiki) at an irradiation intensity of 500 W for about 3 minutes. Thus, an external action was exerted to the dispersion.

X-ray scattering analysis revealed that the peak corresponding to the layer-to-layer distance of 42 Å for the organophilic layered clay mineral had disappeared and a broad peak was observed on the lower angle side, indicating that the layer-to-layer distance was longer than 100 Å. It was thus ascertained that part of the monomer, photopolymerization initiator, and organic solvent had been intercalated between layers of the organophilic layered clay mineral.

0.2 part of trimethylolpropane triacrylate as a crosslinking agent per 100 parts of the monomer was added to the transparent dispersion to which an external action had been thus exerted. The crosslinking agent was uniformly dissolved in the dispersion. This dispersion was applied to a silicone-treated poly(ethylene terephthalate) film having a thickness of 50 μm (hereinafter referred to as "release-agent-treated PET film"; center line average surface roughness $R_a$, 0.06 μm; maximum height $R_{max}$, 0.3 μm) as a releasable substrate. The film coated was subjected to a solvent removal treatment for vaporizing the organic solvent in a drying oven. The coated side of the film was coated with the same release-agent-treated PET film and then irradiated with 900 mJ/cm² ultraviolet using a high-pressure mercury lamp having a light intensity of 5 mW/cm² to photopolymerize the monomer.

By the method described above, a pressure-sensitive adhesive sheet comprising the releasable substrate and a pressure-sensitive adhesive layer having a thickness of 500 μm formed thereon was produced. This pressure-sensitive adhesive layer was constituted of a transparent pressure-sensitive adhesive composition comprising an acrylic polymer and the organophilic layered clay mineral dispersed therein and in which part of the polymer had been intercalated between layers of the clay mineral to cause interlayer separation. X-ray scattering analysis of the pressure-sensitive adhesive layer revealed that the lower-angle-side broad peak observed in the analysis of the dispersion before photopolymerization had become smaller. It was thus ascertained that the interlayer separation in the organophilic layered clay mineral had proceeded further and the layer-to-layer distance was far longer than 100 Å.

COMPARATIVE EXAMPLE 1

Production of Pressure-Sensitive Adhesive Sheet

A mixture of 80 g of 2-ethylhexyl acrylate and 0.05 g of the same photopolymerization initiator as in Example 1 was irradiated in a flask with ultraviolet using an ultraviolet spot irradiator to polymerize 10% by weight of the monomer and thereby thicken the mixture. Thereafter, 0.15 g of the same photopolymerization initiator was added to the reaction mixture and 0.2 parts of the same crosslinking agent as in Example 1 was further added per 100 parts of the monomer. These ingredients added were uniformly dissolved. The monomer composition thus thickened was applied to a releasable substrate consisting of the same release agent-treated PET film as in Example 1. This coated side of the substrate was coated with the same release agent-treated PET film, and the monomer was photopolymerized in the same manner as in Example 1.

Thus, a pressure-sensitive adhesive sheet was produced which consisted of the releasable substrate and formed thereon a pressure-sensitive adhesive layer having a thickness of 500 μm constituted of a pressure-sensitive adhesive composition comprising an acrylic polymer.

COMPARATIVE EXAMPLE 2

Production of Pressure-Sensitive Adhesive Sheet

A mixture of 20 g of the organophilic layered clay mineral obtained in Example 1, 80 g of 2-ethylhexyl acrylate, and 0.2 g of the same photopolymerization initiator as in Example 1 was stirred with a Three-One Motor for 2 hours to obtain a milk-white dispersion. This dispersion was treated with an ultrasonic disperser (manufactured by Nippon Seiki) at an irradiation intensity of 500 W for about 3 minutes. X-ray scattering analysis revealed that the peak corresponding to the layer-to-layer distance of 42 Å for the organophilic layered clay mineral remained.

0.2 parts of the same crosslinking agent as in Example 1 per 100 parts of the monomer was added to this dispersion. This crosslinking agent was uniformly dissolved. The resulting composition was applied to a releasable substrate consisting of the same release agent-treated PET film as in Example 1. This coated side of the substrate was coated with the same release agent-treated PET film, and the monomer was photopolymerized in the same manner as in Example 1.

Thus, a pressure-sensitive adhesive sheet was produced which consisted of the releasable substrate and formed thereon a pressure-sensitive adhesive layer having a thickness of 500 μm comprising an acrylic polymer and the organophilic layered clay mineral dispersed therein. X-ray scattering analysis of the pressure-sensitive adhesive layer revealed that the peak corresponding to the layer-to-layer distance of 42 Å for the organophilic layered clay mineral still remained.

EXAMPLE 2

Production of Pressure-Sensitive Adhesive Sheet

A pressure-sensitive adhesive sheet was produced in the same manner as in Example 1, except that the amounts of the organophilic layered clay mineral and toluene used were changed to 8 g and 50 g, respectively.

EXAMPLE 3

Production of Pressure-Sensitive Adhesive Sheet

A pressure-sensitive adhesive sheet was produced in the same manner as in Example 1, except that the amounts of the organophilic layered clay mineral and toluene used were changed to 80 g and 280 g, respectively.

COMPARATIVE EXAMPLE 3

Production of Pressure-Sensitive Adhesive Sheet

A pressure-sensitive adhesive sheet was produced in the same manner as in Example 1, except that the amounts of the organophilic layered clay mineral and toluene were changed to 5 g and 50 g, respectively.

COMPARATIVE EXAMPLE 4

Production of Pressure-Sensitive Adhesive Sheet

A pressure-sensitive adhesive sheet was produced in the same manner as in Example 1, except that the amounts of the organophilic layered clay mineral and toluene used were changed to 130 g and 600 g, respectively.

EXAMPLE 4

Production of Pressure-Sensitive Adhesive Sheet

A mixture of 20 g of the organophilic layered clay mineral obtained in Example 1, 80 g of butyl acrylate, 0.2 g of the same photopolymerization initiator as in Example 1, and 150 g of toluene as an organic solvent was stirred with a Three-One Motor for 2 hours to obtain a dispersion. This dispersion was treated with the same ultrasonic disperser as in Example 1 at an irradiation intensity of 500 W for about 3 minutes. Thus, an external action was exerted to the dispersion.

X-ray scattering analysis revealed that the peak corresponding to the layer-to-layer distance of 42 Å for the organophilic layered clay mineral had disappeared and a broad peak was observed on the lower-angle side, indicating that the layer-to-layer distance was longer than 100 Å. It was thus ascertained that part of the monomer, photopolymerization initiator, and organic solvent had been intercalated between layers of the organophilic layered clay mineral.

0.2 part of the same crosslinking agent as in Example 1 per 100 parts of the solid components of the dispersion was added to the dispersion to which an external action had been thus exerted. The crosslinking agent was uniformly dissolved. This dispersion was applied to a releasable substrate consisting of the same release-agent-treated PET film as in Example 1. The substrate coated was subjected to a solvent removal treatment for vaporizing the organic solvent in a drying oven. Thereafter, the coated side of the substrate was coated with the same release-agent-treated PET film, and the monomer was photopolymerized in the same manner as in Example 1.

By the method described above, a pressure-sensitive adhesive sheet comprising the releasable substrate and a pressure-sensitive adhesive layer having a thickness of 500 μm formed thereon was produced. This pressure-sensitive adhesive layer was constituted of a transparent pressure-sensitive adhesive composition which comprised an acrylic polymer and the organophilic layered clay mineral dispersed therein and in which part of the polymer had been intercalated between layers of the clay mineral to cause interlayer separation. X-ray scattering analysis of the pressure-sensitive adhesive layer revealed that the lower-angle-side broad peak observed in the analysis of the dispersion before photopolymerization had become smaller. It was thus ascertained that the interlayer separation in the organophilic layered clay mineral had proceeded further and the layer-to-layer distance was far longer than 100 Å.

EXAMPLE 5

Production of Pressure-Sensitive Adhesive Sheet

A mixture of 20 g of the organophilic layered clay mineral obtained in Example 1, 80 g of 2-ethylhexyl acrylate, 0.2 g of the same photopolymerization initiator as in Example 1, and 150 g of toluene as an organic solvent was stirred with a Three-One Motor for 2 hours to obtain a dispersion. This dispersion was treated with a high-shear disperser ("Clear Mix" manufactured by M-Technique) at 20,000 rpm for 30 minutes. Thus, an external action was exerted to the dispersion.

X-ray scattering analysis revealed that the peak corresponding to the layer-to-layer distance of 42 Å for the organophilic layered clay mineral had disappeared and a broad peak was observed on the lower-angle side, indicating that the layer-to-layer distance was longer than 100 Å. It was thus ascertained that part of the monomer, photopolymerization initiator, and organic solvent had been intercalated between layers of the organophilic layered clay mineral.

0.2 part of the same crosslinking agent as in Example 1 per 100 parts of the solid components of the dispersion was added to the dispersion to which an external action had been thus exerted. The crosslinking agent was uniformly dissolved. This dispersion was applied to a releasable substrate consisting of the same release-agent-treated PET film as in Example 1. The substrate coated was subjected to a solvent removal treatment for vaporizing the organic solvent in a drying oven. Thereafter, the coated side of the substrate was coated with the same release-agent-treated PET film, and the monomer was photopolymerized in the same manner as in Example 1.

By the method described above, a pressure-sensitive adhesive sheet comprising the releasable substrate and a pressure-sensitive adhesive layer having a thickness of 500 μm formed thereon was produced. This pressure-sensitive adhesive layer was constituted of a transparent pressure-sensitive adhesive composition comprising an acrylic polymer and the organophilic layered clay mineral dispersed therein and in which part of the polymer had been intercalated between layers of the clay mineral to cause interlayer separation. X-ray scattering analysis of the pressure-sensitive adhesive layer revealed that the lower-angle-side broad peak observed in the analysis of the dispersion before photopolymerization had become smaller. It was thus ascertained that the interlayer separation in the organophilic layered clay mineral had proceeded further and the layer-to-layer distance was far longer than 100 Å.

Each of the pressure-sensitive adhesive sheets obtained in Examples 1 to 5 and Comparative Examples 1 to 4 given above was examined for the content of inorganic ingredients in the pressure-sensitive adhesive layer and for the haze and total light transmittance of the adhesive layer by the following methods. These pressure-sensitive adhesive sheets were further subjected to a heat resistance test by the following method. The results obtained are shown in the Table below.

Content of Inorganic Ingredients:

A given amount (10 mg) of a pressure-sensitive adhesive layer was weighed out and analyzed with a thermogravimetric apparatus ("TGA" manufactured by Seiko Instruments Inc.) to determine weight changes in the range of from room temperature to 900° C. At the temperatures of 600° C. and higher, substantially no weight change occurred. The residual weight in this temperature range was taken as the weight of inorganic ingredients, and the proportion thereof (% by weight) to the initial weight was determined.

Haze and Total Light Transmittance:

A pressure-sensitive adhesive sheet was applied to a slide glass and the releasable substrate was peeled off. Thereafter, the haze and the total light transmittance of this sample were measured with a turbidimeter.

Heat Resistance Test:

The pressure-sensitive adhesive layer of a pressure-sensitive adhesive sheet was examined with a dynamic viscoelasticity analyzer ("ARES" manufactured by Rheometric Scientific FE. Ltd.) in the heating mode (heating rate, 5° C./min; frequency, 10 Hz) to determine the storage moduli at 25° C. and 100° C.

Furthermore, a holding power test was separately conducted in the following manner. The pressure-sensitive adhesive sheet was applied to a Bakelite plate so as to result in an adhesion area of 10 mm×20 mm. This test piece was placed in an 80° C. atmosphere, and a load of 500 g was imposed thereon. After 120 minutes, the test piece was examined for load falling. The test pieces which had suffered load falling are indicated by X, while those which had not suffered load falling are indicated by ○.

TABLE

| | Content of inorganic ingredients (wt %) | Haze (%) | Total light transmittance (%) | Storage modulus (Pa) | | Holding power |
|---|---|---|---|---|---|---|
| | | | | 25° C. | 100° C. | |
| Example 1 | 7.4 | 1.5 | 92.5 | 9.2 × 10$^5$ | 7.2 × 10$^5$ | ○ |
| Example 2 | 3.6 | 1.3 | 93.0 | 1.6 × 10$^5$ | 9.8 × 10$^4$ | ○ |
| Example 3 | 20.8 | 2.5 | 90.2 | 1.5 × 10$^7$ | 9.3 × 10$^6$ | ○ |
| Example 4 | 8.1 | 1.1 | 92.0 | 4.1 × 10$^6$ | 2.8 × 10$^6$ | ○ |
| Example 5 | 7.3 | 1.8 | 91.8 | 7.2 × 10$^5$ | 5.1 × 10$^5$ | ○ |
| Comparative Example 1 | 0.0 | 1.3 | 93.1 | 2.1 × 10$^4$ | 7.1 × 10$^3$ | X |
| Comparative Example 2 | 7.7 | 7.7 | 85.0 | 7.5 × 10$^4$ | 3.2 × 10$^4$ | X |
| Comparative Example 3 | 2.3 | 1.1 | 92.2 | 3.7 × 10$^4$ | 1.8 × 10$^4$ | X |
| Comparative Example 4 | 25.8 | 6.6 | 83.0 | 2.2 × 10$^7$ | 1.1 × 10$^7$ | ○ |

As apparent from the results shown in the above Table, the pressure-sensitive adhesive sheets obtained in Examples 1 to 5 were satisfactory in both transparency (haze and total light transmittance) and high temperature adhesive properties (storage modulus at 100° C. and holding power at 80° C.). In contrast, the pressure-sensitive adhesive sheets obtained in Comparative Examples 1 to 4, which each had a constitution different from that of the invention, were found to be unsatisfactory in either of the transparency and high-temperature adhesive properties or in both.

As described above, a pressure-sensitive adhesive composition is produced according to the invention by mixing one or more acrylic-based monomers with specific amounts of an organophilic layered clay mineral and a polymerization initiator together with an organic solvent, exerting an external action on the mixture to thereby intercalate part of the monomers, polymerization initiator, and organic solvent into interstices of the clay mineral, subsequently removing the solvent, and then polymerizing the monomers. In this process, part of the acrylic polymer which is being yielded is intercalated between layers of the clay mineral to cause interlayer separation and thereby make the clay mineral have a layer-to-layer distance of 100 Å or longer. Thus, a transparent pressure-sensitive adhesive composition which can combine transparency and high-temperature adhesive properties and a pressure-sensitive adhesive sheet employing the composition can be provided.

What is claimed is:

1. A transparent pressure-sensitive adhesive composition which comprises a polymer of one or more monomers comprising from 70 to 100% by weight of at least one alkyl (meth)acrylate having 2 to 14 carbon atoms in the alkyl moiety and from 30 to 0% by weight at least one monoethylenically unsaturated monomer copolymerizable therewith and an organophilic layered clay mineral dispersed in the polymer in an amount of from 10 to 150 parts by weight per 100 parts by weight of the polymer, wherein part of the polymer has been intercalated between layers of the clay mineral to cause interlayer separation and the clay mineral has a layer-to-layer distance of 100 Å or longer.

2. The transparent pressure-sensitive adhesive composition as claimed in claim 1, wherein the organophilic layered clay mineral is formed by ion exchange between exchangeable inorganic ions of a layered clay mineral and organic onium ions.

3. The transparent pressure-sensitive adhesive composition as claimed in claim 2, wherein the organic onium ions are organic ammonium ions.

4. The transparent pressure-sensitive adhesive composition as claimed in claim 1, wherein the content of inorganic ingredients is from 3 to 25% by weight.

5. The transparent pressure-sensitive adhesive composition as claimed in claim 1, which when examined in the form of a film, has a haze of 5% or lower and a total light transmittance of 85% or higher.

6. A transparent pressure-sensitive adhesive composition which comprises a polymer of one or more monomers comprising from 70 to 100% by weight of at least one alkyl (meth)acrylate having 2 to 14 carbon atoms in the alkyl moiety and from 30 to 0% by weight of at least one monoethylenically unsaturated monomer copolymerizable therewith and an organophilic layered clay mineral dispersed in the polymer in an amount of from 10 to 150 parts by weight per 100 parts by weight of the polymer, wherein part of the polymer has been intercalated between layers of the clay mineral to cause interlayer separation and the clay mineral has a layer-to-layer distance of 100 Å or longer, wherein the composition is produced by a process comprising mixing the 100 parts by weight of the one or more monomers comprising from 70 to 100% by weight of at least one alkyl (meth)acrylate in which the alkyl group has 2 to 14 carbon atoms and from 30 to 0% by weight of at least one mono-ethylenically-unsaturated monomer copolymerizable therewith with the from 10 to 150 parts by weight of the organophilic layered clay mineral and from 0.005 to 5 parts by weight of a polymerization initiator together with an organic solvent; exerting an external action on this mixture to thereby intercalate part of the monomers, polymerization initiator, and organic solvent into interstices of the organophilic layered clay mineral; subsequently removing the solvent; and then polymerizing the monomers.

7. The transparent pressure-sensitive adhesive composition as claimed in claim 6, wherein the external action is a shearing external action or a vibrating external action.

8. A pressure-sensitive adhesive sheet which comprises a releasable substrate or non-releasable substrate and, disposed thereon, a pressure-sensitive adhesive layer comprising the transparent pressure-sensitive adhesive composition as claimed in claim 1.

9. A process for producing the transparent pressure-sensitive adhesive composition as claimed in claim 1 which comprises: mixing 100 parts by weight of one or more monomers comprising from 70 to 100% by weight at least one alkyl (meth)acrylate in which the alkyl group has 2 to 14 carbon atoms and from 30 to 0% by weight at least one mono-ethylenically-unsaturated monomer copolymerizable therewith with from 10 to 150 parts by weight of an organophilic layered clay mineral and from 0.005 to 5 parts by weight of a polymerization initiator together with an organic solvent; exerting an external action on this mixture to thereby intercalate part of the monomers, polymerization initiator, and organic solvent into interstices of the organophilic layered clay mineral; subsequently removing the solvent; and then polymerizing the monomers.

10. The process for producing a transparent pressure-sensitive adhesive composition as claimed in claim 9, wherein the external action is a shearing external action or a vibrating external action.

11. A process for producing a pressure-sensitive adhesive sheet, wherein the pressure-sensitive adhesive sheet comprises a releasable substrate or non-releasable substrate and, disposed thereon, a pressure-sensitive adhesive layer comprising a transparent pressure-sensitive adhesive composition, wherein the transparent pressure-sensitive adhesive composition comprises a polymer of one or more monomers comprising from 70 to 100% by weight of at least one alkyl (meth)acrylate having 2 to 14 carbon atoms in the alkyl moiety and from 30 to 0% by weight of at least one monoethylenically unsaturated monomer copolymerizable therewith and an organophilic layered clay mineral dispersed in the polymer in an amount of from 10 to 150 parts by weight per 100 parts by weight of the polymer, wherein part of the polymer has been intercalated between layers of the clay mineral to cause interlayer separation and the clay mineral has a layer-to-layer distance of 100 Å or longer, the process comprising conducting the steps of solvent removal and polymerization in the process as claimed in claim 9 on the releasable substrate or the non-releasable substrate.

* * * * *